Nov. 10, 1942.  C. BRONGERSMA  2,301,678
CONTROLLER ACTUATOR
Filed June 11, 1941
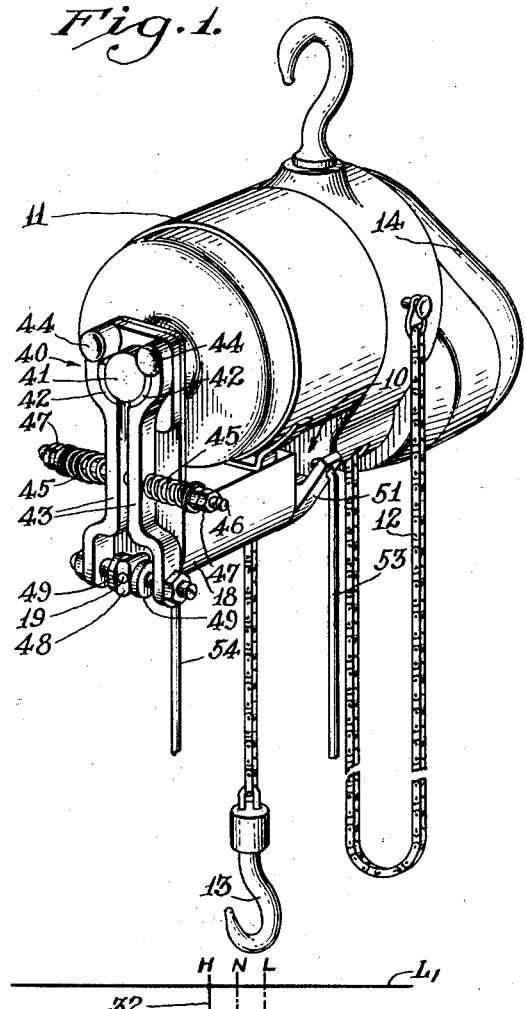
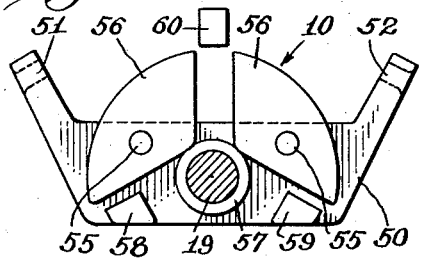
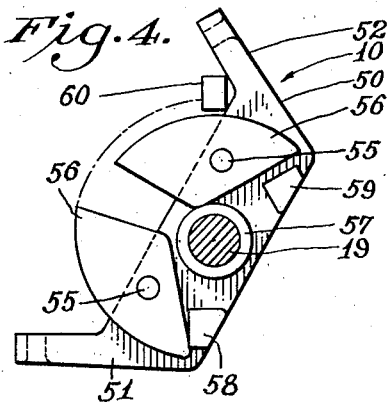
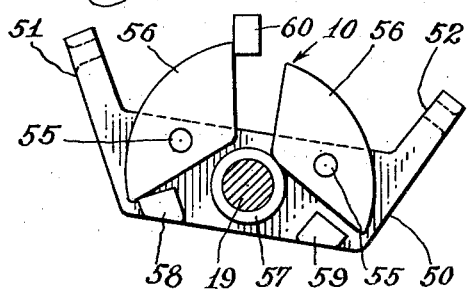
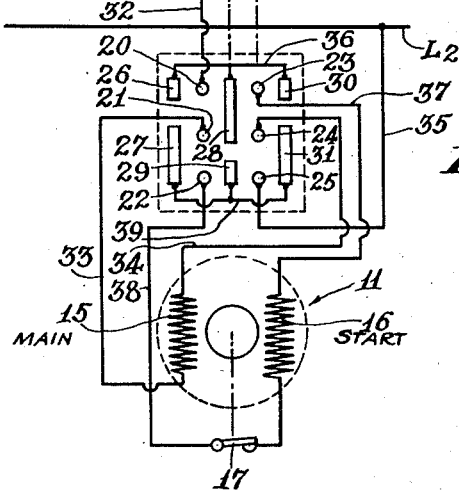
Inventor
Cornelius Brongersma
BY
Attorneys.

Patented Nov. 10, 1942

2,301,678

UNITED STATES PATENT OFFICE 2,301,678

CONTROLLER ACTUATOR

Cornelius Brongersma, Muskegon Heights, Mich., assignor to Manning, Maxwell & Moore, Inc., Muskegon, Mich., a corporation of New Jersey Application June 11, 1941, Serial No. 397,526

4 Claims. (Cl. 74—565)

The invention pertains to improvements in actuators for the controllers of reversible electric motors.

To appreciate the problem which the present invention is intended to solve, attention must be given to the peculiar difficulties attendant upon an attempt to reverse certain forms of single phase alternating current motors. It is common practice in the case of various types of single phase alternating current motors to provide a main energizing winding and an auxiliary or starting winding together with a speed responsive switch or relay for cutting the starting winding out of service when the motor comes up to a predetermined speed, such motors being commonly designated as split phase motors, and may employ various means such as a capacitor for obtaining a desired phase differential between the main and starting winding currents. Such motors have the inherent peculiarity that they cannot, in engineering parlance, be "plugged." In other words, if the motor is operating in one direction, with its starting winding cut out of circuit by the speed responsive switch, the motor cannot be reversed simply by reversing the supply connections to its main winding terminals. In fact, such reversal of these connections will simply cause the motor to keep on running in the initial direction. To make the motor reverse it is imperative that both the main and auxiliary windings be in circuit and that their connections be reversed with respect to each other. The prime difficulty is that the starting winding, under the conditions noted, is not only out of circuit but is held out by a speed responsive switch or relay.

One field in which the problem outlined above is particularly acute is that of electric hoists and the present invention has been disclosed herein as applied to such an installation. In small hoists it is desirable to use a split phase motor because of its notoriously low cost and simplicity. If it is to be used, however, assurance of reversal at all times is imperative. It will be understood that if the hoist is lowering a load, and the motor controller thrown to reverse the motor and raise the load, that any failure of the motor actually to reverse might well entail destruction of the load as well as injury to the operator.

One object of the present invention is to provide a novel controller actuator which positively compels a slow shift of the controller from its forward to its reverse position or vice versa. In installations of the type herein contemplated it is common to provide a brake for slowing the motor, which is automatically applied when the controller is in neutral and released whenever it is shifted to forward or reverse. Hence, with an actuator for the controller which actually compels a slow shift from forward to reverse, or vice versa, the brake has an opportunity, during the shift of the controller, to slow the motor down to a point where the starting winding is cut back into circuit by the speed responsive switch so that actual reversal of the motor is assured.

More specifically, it is an object of the invention to provide such an actuator embodying a novel centrifugal weight and stop arrangement such that the weight will be jammed against the stop to prevent full throw of the controller from one extreme position to the other except when the controller is shifted slowly.

A further object is to provide a controller actuator of the character indicated comprising a very rugged, simple and low cost arrangement of parts.

Further objects and advantages of the invention will become apparent as the following description proceeds taken in connection with the accompanying drawing in which:

Figure 1 is a perspective view of an electric hoist provided with a controller actuator embodying the invention.

Fig. 2 is a wiring diagram of the motor and controller for the hoist of Fig. 1.

Fig. 3 is an enlarged detail end view of the controller actuator included in the apparatus of Fig. 1, the actuator being shown in neutral position.

Fig. 4 is a view similar to Fig. 3, showing the actuator in its "hoisting" position.

Fig. 5 is also a view similar to Fig. 3 but showing the actuator parts jammed against further movement from "hoisting" toward "lowering" position, in the manner which results when the actuator is thrown too rapidly.

While the invention is susceptible of various modifications and alternative constructions, I have shown in the drawing and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the illustrative construction the invention has been shown as embodied in a controller actuator, designated generally as 10, for an electric hoist such as that of Fig. 1. The hoist there shown comprises an electric motor 11 arranged to drive a sprocket (not shown) over which runs a roller type hoisting chain 12 with a load hook 13 on its depending lower end. The motor is connected to the sprocket through a speed reduction gearing housed in a casing 14. As to a suitable arrangement for the gearing and structural mounting of the motor and gear elements. etc., reference may be made to Preston W. Whitcomb Patent No. 2,211,873, issued August 20, 1940.

The motor 11 is, in the present instance, a split phase alternating current motor having a main winding 15 and an auxiliary or starting winding 16 (see Fig. 2). In order to make the motor as low in cost as possible, the starting winding 16 is designed to have a low curent carrying capacity, and accordingly must be cut out of circuit after the motor has started in order to avoid burning it out under sustained load.

To this end, a speed responsive switch 17 is connected in series with the starting winding 16. This switch may be of the conventional centrifugal type ordinarily supplied in such motors, and in general, is arranged to open, and thereby deenergize, the starting winding 16 as soon as the motor 11 accelerates to a speed of predetermined value. During stoppage of the motor, the switch 17 will reclose, during the deceleration period, although usually at a somewhat lower speed than that at which it opens, due to the inherent sluggishness of such switches.

Within a housing 18 fixed beneath the motor 11 (see Fig. 1) is a reversing controller, of conventional form, for the motor. This controller embodies a longitudinally extending rock shaft 19, normally spring urged to a centered position, and oscillatably in opposite directions for energizing the motor for hoisting or lowering, respectively. The layout of contacts for the controller is shown in developed form in Fig. 2. As there shown, two rows of fixed contacts 20—21—22 and 23—24—25 are provided as well as a set of movable contacts 26 to 31, arranged to be shifted by the rock shaft 19. When the rock shaft is in its neutral position, the center line of the group of movable contacts occupies the position indicated by the dot-dash line N in Fig. 2, and similarly when the rock shaft is in its "hoisting" or "lowering" positions the center line of the movable contacts occupies, respectively, the positions indicated by the dot-dash lines H and L. Thus the controller has a central "off" position and two alternating "in" positions. Single phase alternating current is supplied to the motor 11 through the controller from supply lines $L_1$ and $L_2$.

When the controller is in its "off" or "neutral" position (indicated in Fig. 2) the motor 11 is open circuited and hence stopped, and when the controller is in its alternative "on" positions the motor is energized for rotation in respectively opposite directions, i. e. for respectively hoisting and lowering the load. Thus when the movable contacts of the controller are shifted to their "hoisting" position, the main winding 15 of the motor is energized (through a circuit $L_1$—32—20—28—21—33—15—34—24—31—25—35—$L_2$) and at the same time the starting winding 16 is also energized (through a circuit $L_1$—32—20—28—36—30—23—37—16—17—38—22—29—39—31—25—35—$L_2$). Since the speed responsive switch 17 is included in the circuit outlined just above for the starting winding 16, this latter winding will be deenergized as soon as the motor comes up to speed and opens the switch 17. Similarly, when the controller is shifted to its "lowering" position, the motor main winding 15 is energized, although in a reverse sense as compared to that for hoisting (through a circuit $L_1$—32—20—26—36—28—24—34—15—33—21—27—39—29—25—35—$L_2$), while the starting winding 16 is energized in the same sense as before (through a circuit $L_1$—32—20—26—36—28—23—37—16—17—38—22—27—39—29—25—35—$L_2$). As in the previous case, the speed responsive switch 17 is included in the starting winding circuit and, accordingly, deenergizes the same after the motor reaches the predetermined speed for which this switch is set.

To arrest motor rotation when the controller is in neutral, a so-called motor brake 40 is provided (Fig. 1). This brake comprises a brake drum 41 fast on the outboard end of the motor shaft and a cooperating pair of brake shoes 42, frictonally engageable with the brake drum, and carried by respective ones of arms 43 pivoted on the outer end of the motor casing at 44. The arms 43 are yieldably urged toward each other by a pair of compression springs 45 encircling a rod 46 passing loosely through registering holes in the arms. The springs are interposed between the outer surfaces of the respective arms and nuts 47 thread on the pin 46. With the arms 43 thus pressed toward each other by the springs 45, the shoes 42 normally engage the drum 41 for the application of braking force.

To release the brake 40, a cam 48 is fixed on the outer end of the controller rock shaft 19 and is interposed between a pair of adjustably mounted cam follower shoes 49 on the respective arms 43. The cam 48 is provided with a pair of diametrically opposed lobes. When the cam is positioned as shown in Fig. 1 with its lobes or projections vertically disposed, it is out of contact with the shoes 49. Upon turning the rock shaft alternatively to either its hoisting or lowering position, the lobes of the cam 48 engage the shoes 49 and thrust the arms 43 apart to release the brake.

In accordance with my invention, I have provided for the controller, a novel form of actuator 10 of such character that the user of the device is absolutely compelled to shift the controller slowly from hoisting to lowering position or vice versa. During such slow shifting of the controller the motor is deenergized and consequently tends to coast to a stop and in addition the brake 40 is applied during the dwell period thus introduced in the operation of the controller, so that the motor is slowed down to a point at which the speed responsive switch 17 recloses. With the speed responsive switch thus reclosed, proper reversal of the motor is assured.

The construction and operation of the illustrative form of actuator 10 can best be seen by reference to Figs. 3 to 5. As there shown the actuator for the controller comprises a cross bar or carrier 50, rigidly fixed on the inner end of the controller rock shaft 19. The carrier 50 has integral arms 51, 52 extending upwardly and outwardly therefrom. Controller pull cords 53 and 54 (see Fig. 1) are fixed to respective ones of these arms 51, 52. Upon pulling down on the cord 53 the controller rock shaft 19 is turned in a counterclockwise direction (as viewed in Fig. 3) to shift the controller contacts to their hoisting position. Similarly upon pulling downward on the other cord 54 the controller rock shaft is turned in the opposite or clockwise direction, from the neutral position shown in Fig. 3, to close the controller contacts for lowering. The conventional centering spring (not shown) in the controller normally tends to return the rock shaft 19 to its neutral position upon release of either of the pull cords 53, 54.

Mounted on the carrier 50, by pivot pins 55, is a pair of sector-shaped weights 56. The pivots 55 are located somewhat eccentrically, outward of the centers of the weights, so that when the carrier 50 is properly at rest in its neutral position as shown in Fig. 3, the weights 56 tilt inwardly toward each other about the pivots 55 and rest on a collar or bushing 57 encircling the rock shaft 19.

When the cord 53 is pulled to tilt the carrier 50 counterclockwise to its hoisting position, shown in Fig. 4, the left hand one of the weights 56 falls or tilts outward about its pivot 55 away from the bushing 57, until the lower nose of the weight comes to rest against a stop 58 on the carrier. It will be apparent that when the carrier 50 is tilted in its opposite extreme position, for lowering, that the other or right hand one of the weights 56 will swing about its pivot 55, due to the eccentric portion of its weight at its upper end, so that its lower portion rests against a corresponding stop 59 fixed on the carrier.

Cooperating with the pivoted weights 56 described above, to compel slow shifting movement of the carrier 50, is a stationary stop 60 rigid with the hoist frame. In the event that the carrier 50 is turned clockwise from the position of Fig. 4, if the movement is carried out slowly, the left hand one of the weights 56 will tilt about its pivot 55 back into the position shown in Fig. 3. In the event of such slow movement of the carrier, this tilting of the weight will take place prior to the time that it reaches the stop 60 so that the weight passes freely beneath this stop and without interference. In the event, however, that the operator jerks the carrier 50 rapidly in a clockwise direction, the left hand one of the weights 56 will be retained, by its inertia augmented by centrifugal force and by friction at the pivot 55, in its projected or outwardly tilted position shown in Fig. 4 so that it jams solidly against the stationary stop 60 as shown in Fig. 5. Accordingly, further movement of the carrier 50 is positively arrested at a point short of the closure of the controller contacts for lowering and prior to the point at which the cam 48 releases the brake 40. The operator is thus compelled to ease up on the pull cord 54 and permit the carrier 50 to turn back far enough to free the weight 56 engaged with the stationary stop. In this way sufficient dwell, while the brake is applied, is compelled in order to assure a slowing down of the motor, such that the speed responsive switch 17 is permitted to reclose.

The operation is substantially the same in shifting the carrier 50 from its opposite extreme tilted position toward the other, that is, from lowering to hoisting position. Thus, when the carrier is in lowering position, it is tilted to the right (as viewed in Figs. 3 to 5) and in such case the right hand weight 56 is tilted outward, resting on its stop 59. Then as the carrier is swung over toward the left for hoisting, if the motion is slow, the right hand weight tilts in against the collar 57 and clears the stationary stop 60. On the other hand, if the carrier motion is rapid, the weight does not have time to tilt inward before it reaches the stop 60 and consequently jams against the latter, arresting the carrier motion.

From the foregoing it will be seen that the upper nose portions of the weights 56 constitute, in effect, latches engageable, when projected, with the stationary stop 60. Likewise the body portions of the weights constitute means for projecting and retracting such latches in accordance with the speed with which the carrier 50 is oscillated.

I claim as my invention:

1. An actuator mechanism for a reversing controller of an electric motor of the type reversible only when its speed is reduced to a predetermined value, as by the application of an associated brake which is automatically set when the controller is in neutral and released whenever the controller is shifted to forward or reverse positions, comprising in combination, a reversing controller member oscillatable from a central "off" position alternatively in opposite directions to respective "on" positions, a carrier, means connecting said carrier to said oscillatable controller member for movement in unison therewith, means defining a stop on said carrier, a stationary stop adjacent said carrier, a weight, and means movably supporting said weight on said carrier for limited movement from a retracted position in which said weight clears said stationary stop as said carrier is rocked slowly, to a projected position in which it jams between said stops and locks said carrier against movement substantially past neutral when said carrier is oscillated rapidly from one "on" position to the other.

2. An actuator mechanism for a reversing controller of an electric motor of the type reversible only when its speed is reduced to a predetermined value, as by the application of an associated brake which is automatically set when the controller is in neutral and released whenever the controller is shifted to forward or reverse positions, comprising in combination, a reversing controller member oscillatable from a central "off" position alternatively in opposite directions to respective "on" positions, a carrier, means connecting said carrier to said oscillatable controller member for movement in unison therewith, whereby said carrier is tilted from a central position to alternative opposite extreme tilted positions as said controller member is respectively oscillated from its "off" position to one or the other of its "on" positions, a pair of generally sector shaped weights, means pivotally supporting said weights on said carrier on the opposite sides of the latter's axis of oscillation with the points of the sectors projecting toward said axis, the points of pivotal support of said weights being located eccentrically outward of the centers of said weights, whereby said weights tilt inwardly about their pivots toward each other when said carrier is in its central position, stops on said carrier beneath the outer portions of respective ones of said weights, said weights being respectively tilted outwardly against said stops when the carrier is tilted into its corresponding extreme positions of movement, a stationary stop located generally centrally above the axis of oscillation of said carrier and positioned to engage either of said weights when the latter is tilted outward against its corresponding stop on the carrier, whereby an oscillation of said carrier from one extreme position thereof toward the other causes the weight on the previously lowered portion thereof to jam between its stop on the carrier and said stationary stop in the event that such oscillation is too rapid to permit the weight to tilt inwardly about its pivot before it reaches said stationary stop.

3. An actuator mechanism for a reversing controller of an electric motor of the type reversible only when its speed is reduced to a predetermined value, as by the application of an associated brake which is automatically set when the controller is in neutral and released whenever the controller is shifted to forward or reverse positons, comprising in combination, a horizontal controller rock shaft, a cross arm rigid with said rock shaft and extending generally horizontally when said rock shaft is in its mid position, a pair of generally sector shaped weights, means pivotally supporting said weights on said cross arm at opposite sides of the latter's axis of oscillation with the points of the sectors projecting toward said axis, the points of pivotal support of said weights on said arm being located eccentrically outward of the centers of said weights, whereby said weights tilt inwardly toward each other about their pivots when said cross arm is horizontal, stops on said cross arm beneath the outer portions of respective ones of said weights, said weights being respectively tilted outwardly against their stops when the cross arm is tilted correspondingly from its horizontal position, a stationary stop located generally centrally above the axis of oscillation of said cross arm and positioned to engage either of said weights when the latter is tilted outward against its corresponding stop on the cross arm, and operating pull cords attached to respective extremities of said cross arm.

4. An actuator mechanism for a reversing controller of an electric motor of the type reversible only when its speed is reduced to a predetermined value, as by the application of an associated brake which is automatically set when the controller is in neutral and released whenever the controller is shifted to forward or reverse positions, comprising in combination, a horizontal controller rock shaft oscillatable from a central "off" position alternatively in opposite directions to respective "on" positons, a cross arm rigid with said rock shaft and positioned horizontally when the rock shaft is in its "off" position, a weight, means movably supporting said weight on said cross arm for movement with the latter, the displacement of said weight outward from the center of oscillation of the cross arm, as the latter oscillates with the rock shaft, being generally proportional to the speed of cross arm movement, means including a stationary stop engageable with said weight when the latter is moved outward a predetermined distance from said center for arresting movement of said weight and cross arm, and operating pull cords attached to respective opposite ends of said cross arm for tilting the same.

CORNELIUS BRONGERSMA.